Dec. 31, 1957  N. M. McGRANE ET AL  2,818,136
CLEANING-AIR RING FOR CYLINDRICAL FILTER ELEMENT
Filed May 26, 1955  2 Sheets-Sheet 1
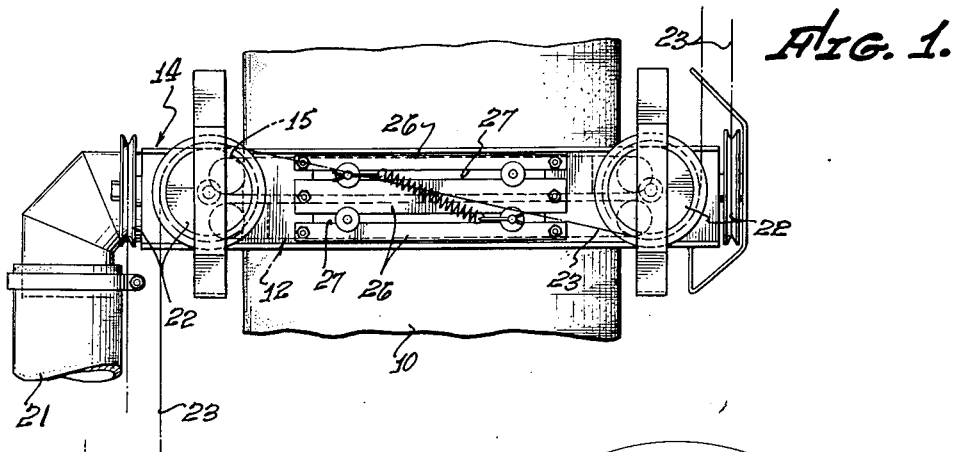
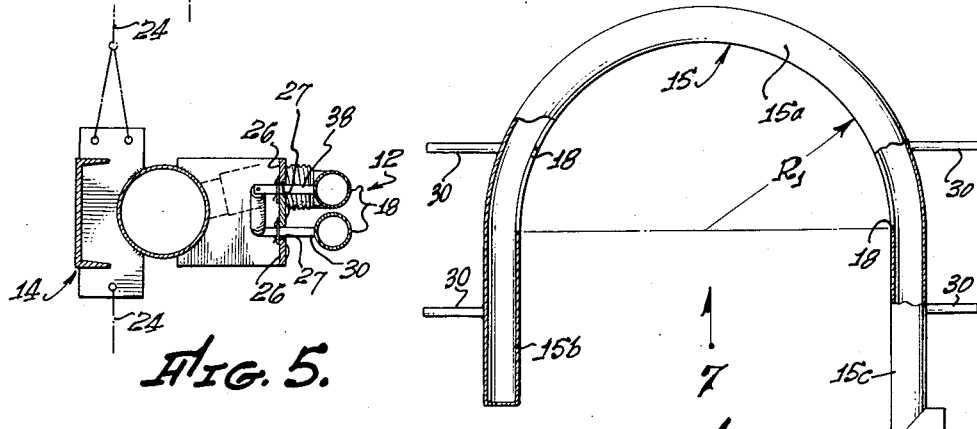
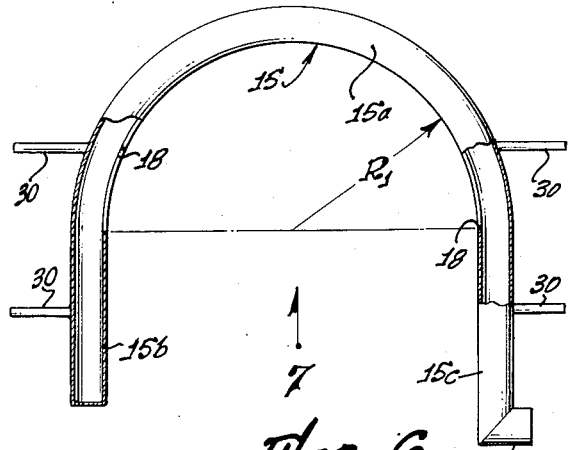
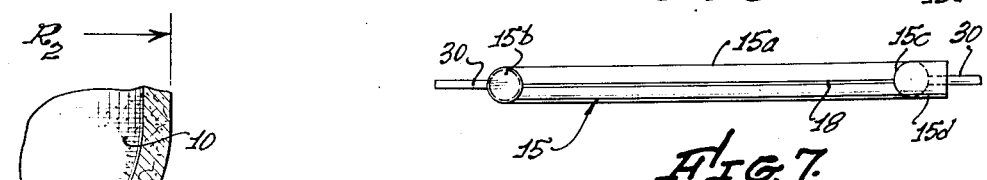
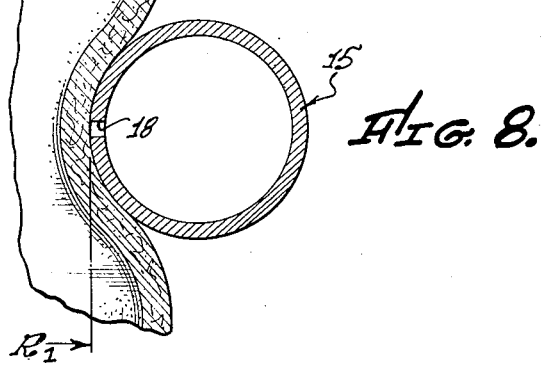
NORMAN M. McGRANE,
DAVID B. PERLIS,
INVENTORS.
BY
ATTORNEYS

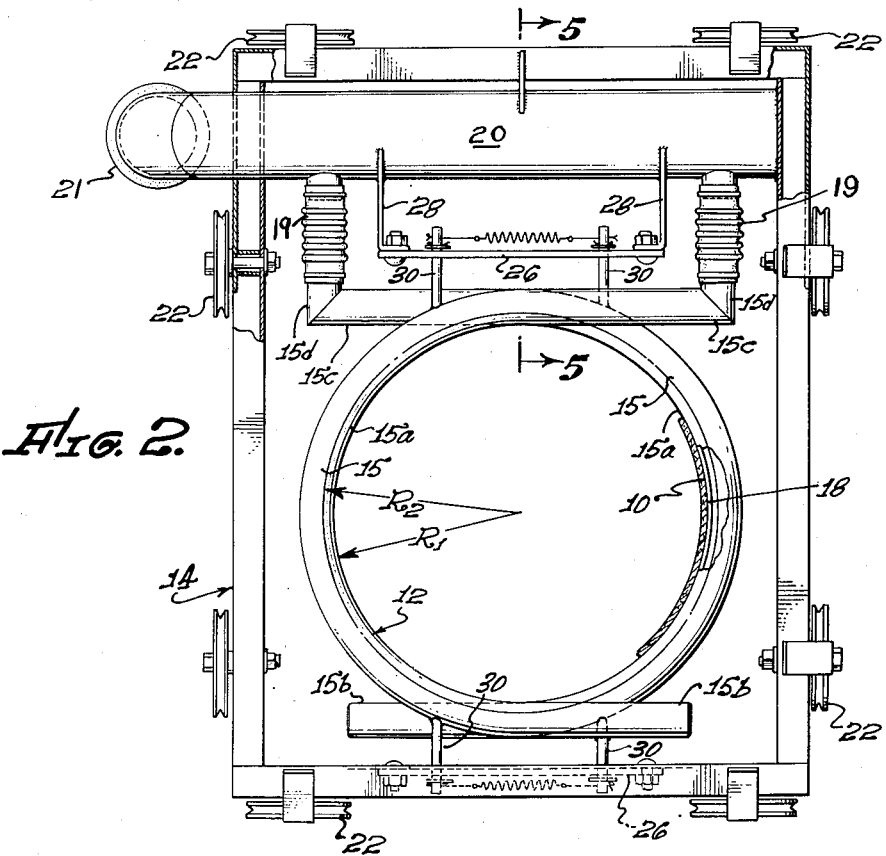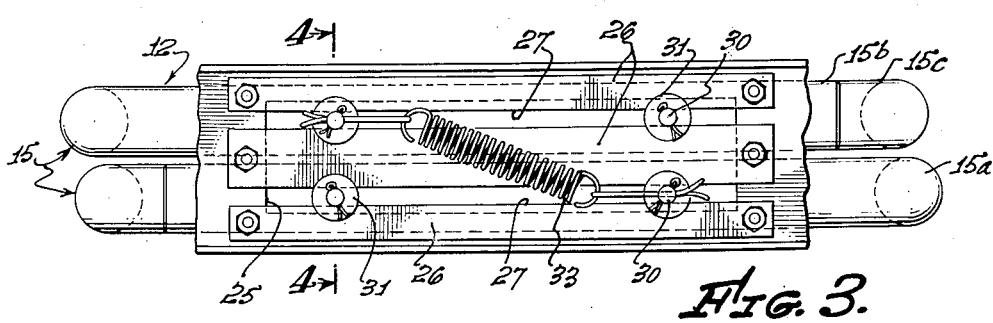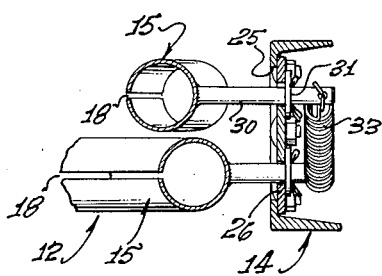

United States Patent Office 2,818,136
Patented Dec. 31, 1957

2,818,136

CLEANING-AIR RING FOR CYLINDRICAL FILTER ELEMENT

Norman M. McGrane, Long Beach, and David B. Perlis, Sun Valley, Calif., assignors to Western Precipitation Corporation, Los Angeles, Calif., a corporation of California Application May 26, 1955, Serial No. 511,380

4 Claims. (Cl. 183—61)

The present invention relates generally to self-cleaning apparatus for filtering dust-laden gases, and more particularly to improvements in means for cleaning a filter element by a jet of relatively high pressure air or other gas blown through the filter element in the reverse direction to the main flow of gas being filtered.

In filters of this type, the filter element is an elongated, cylindrical member, which is typically made of felt or other similar material having very fine interstices which make the filter element highly effective in removing very small particles suspended in the gas stream. The gas stream is normally introduced inside the filter element, which is distended by the gas pressure, and the gas stream is cleaned as it passes outwardly through the walls of the filter element. The dirt or dust particles deposited on the inside face of the filter element are removed by directing a jet of cleaning air through the filter element to blow these dust particles off the inner face of the filter element. The jet of cleaning air issues from a relatively narrow, elongated orifice at the inside of a ring-like member, termed a cleaning-air ring or blow ring surrounding the filter element and reciprocated along the filter element in order to subject as much as possible of the length of the filter to the cleaning action of the air jet. A typical filter of this type is disclosed in Patent No. 2,495,635 issued January 24, 1950 to H. J. Hersey, Jr.

It has been found that the effectiveness of the cleaning air jet in cleaning the filter element is determined chiefly by the character and extent of the contact between the cleaning-air ring and the outside surface of the filter element. For example, as is brought out in Patent No. 2,551,126 issued May 1, 1951 to H. J. Hersey, Jr., effectiveness of the cleaning jet is improved by causing the filter element to be indented slightly by the blow ring so that the outer surface of the filter element is in engagement with the ring for a short distance beyond each side of the orifice in the ring, thus providing a seal against the escape of the cleaning air at this point. It has been determined that the depth of this indentation is of importance. If the blow ring is pressed against the filter element too tightly, excessive wear of the filter element occurs; but, more importantly, if the ring is not pressed against the filter element firmly enough cleaning air escapes without going through the filter element and the effectiveness of the cleaning-air jet is reduced. For this reason, it is obviously desirable to control the depth of indentation very closely, to have the depth of indentation as nearly uniform as possible, and to have it extend around the entire filter element.

It has also been found that the cleaning effect of the jet does not extend laterally for any appreciable distance outside the area actually traversed by the jet. Reversely stated, in order to keep the filter element clean and at maximum filtering efficiency, the maximum possible portion of the surface of the element should actually be scanned by the cleaning jet.

A rigid or one-piece ring around the cylindrical filter element provides the ideal arrangement for securing both uniformity of indentation and maximum area coverage by the orifice relative to the surface of the filter element. However, in practice a rigid blow ring has been found impractical because of inequalities and changes in the diameter of filter elements and therefore a rigid ring has been replaced by an adjustable ring which normally is made in a plurality of sections or units. For this reason, the assembly of units is still commonly referred to as a ring, even though it is composed of several separate parts. However, multi-sectional rings so far known do not achieve maximum cleaning efficiency because of lack of proper and uniform indentation or because of failure to scan all the usable filter area or for a combination of these and other reasons.

Thus it becomes a general object of our invention to provide a cleaning-air ring for a cylindrical filter element which is adjustable to differences in the dimensions of the filter element and yet always provides maximum cleaning efficiency of the air jet issuing from the orifices in the ring.

It is another object of our invention to provide a cleaning-air ring of the type described having a plurality of units in which the individual orifices in the several units overlap or are alined with each other in a manner to leave no area between them which is not scanned by the jet as it is reciprocated longitudinally of the filter element.

A further object of our invention is to provide an adjustable cleaning-air ring of the character described in which the depth of indentation of the ring into the cylindrical filter element is substantially uniform throughout the entire circumference of the filter element.

Another object of our invention is to provide a cleaning-air ring of the character described which has no portions at which wear is concentrated on the filter element, thus contributing to the maximum possible life of the filter element as it is traversed by the ring.

These and other objects and advantages are achieved according to our invention by providing a cleaning-air ring that comprises a plurality of similar hollow units which are arranged so that the orifices completely encircle the filter element, the units being arranged one above another and with the ends of the units in overlapping relation. Each unit has an intermediate arcuate section of uniform radius in full contact with the filter element and terminal sections at which contact is broken off with the filter element. Hence the terminal sections extend beyond the filter element; and they are preferably tangent to the arcuate section, though they may have other shapes. In the arcuate section is an elongated orifice extending at least the full length of the arcuate section at its inner face in a position to direct a jet of cleaning air toward and through the filter element. The units of the ring are so arranged that each end of one orifice is substantially in vertical alinement with the end of another orifice so that all of the several orifices together extend for the full circumference of the cylindrical filter element. Actually a slight overlap may occur. Means is provided urging each unit of the ring against the filter element to produce the desired degree of indentation of the filter element at the orifice of that unit.

The cleaning-air ring is mounted on a carriage which is reciprocated lengthwise of the filter element in order to move the cleaning-air ring over the length of the element to be cleaned. This carriage has mounted on it means for defining a plurality of pairs of straight parallel slots which lie in horizontal planes extending transversely to the axis of the filter element. Each unit of the cleaning-air ring has two pairs of outwardly extending pins attached to it. Each pair of pins is positioned in one of the slots, being free to slide therein lengthwise of the slot. The two pins in one slot prevent the ring from moving relative to the carriage except in the direction of the slot; and provision of two such guide means at positions angularly spaced around the circumference of the filter element stabilizes the position of each unit of the ring with respect to the carriage.

How the above objects and advantages of our invention, as well as others not particularly referred to herein, are attained will be more readily understood by reference to the following description and to the annexed drawing, in which:

Fig. 1 is a side elevation of a carriage showing mounting means for a preferred embodiment of the cleaning-air ring, along with a portion of the cylindrical filter element;

Fig. 2 is a plan view of the cleaning-air ring and the carriage therefor;

Fig. 3 is an enlarged side elevation similar to Fig. 1 but with portions of the carriage broken away to show the cleaning-air ring;

Fig. 4 is a transverse vertical section through the means for mounting the ring units on the carriage, taken on line 4—4 of Fig. 3;

Fig. 5 is a vertical fragmentary section on line 5—5 of Fig. 2;

Fig. 6 is a combined plan and horizontal median section of one unit of a preferred form of cleaning-air ring;

Fig. 7 is a side elevation of the ring of Fig. 6 viewed in the direction of the arrow 7; and Fig. 8 is an enlarged fragmentary section through a unit of the cleaning-air ring showing the contact therewith of the filter element.

Referring now to the drawings, there is shown in Fig. 1, in particular, a filter element 10 which is preferably made of felt or other matted or felt-like material producing interstices that are sufficiently small to catch very fine particles of material suspended in a stream of gas. Some kinds of woven material may be used. The filter element is cylindrical in shape and is normally positioned with its axis extending vertically. The cylindrical filter element is supported by suitable means at its top and bottom ends, such means not being shown in the drawings but reference may be had to the aforementioned Hersey Patent 2,495,635 for an example of such means.

A stream of gas carrying particles in suspension is introduced inside cylindrical element 10 under a pressure greater than the gas pressure existing on the outside of the filter element so that the gas passes outwardly through the filter element, depositing the suspended solid particles on the inside surface of the filter element.

The accumulated layer of solids on the inside of the filter element is removed by a cleaning device which directs a jet of high velocity air against and through the filter element in a direction opposite to that of the flow of the main gas stream. As will be more evident as the description proceeds, this jet of cleaning air, being of relatively small area, is moved back and forth vertically over the filter element for the entire area used for filtration to be traversed and cleaned by the jet of cleaning air.

The means for cleaning the filter element comprises a cleaning-ring indicated generally at 12 in Fig. 2, the ring being mounted on the carriage indicated generally at 14 which reciprocates the ring over the outer surface of the filter element, in the direction of the vertical longitudinal axis of the filter element.

Ring 12 for the cleaning-air is commonly referred to as a blow ring; and in the preferred form of our invention herein disclosed comprises two similar U-shaped hollow units 15. One of these units is shown in greater detail in Figs. 6 and 7, both of the units being alike. Each unit comprises a central or intermediate section 15a which is curved through 180° of arc with a uniform radius. At the inside of the curve the radius $R_1$ is less by a small amount, typically about ¼" to ½", than the outside radius $R_2$ of filter element 10 when distended under normal internal operating pressure, as seen in Figs. 2 and 8.

Each unit of the blow ring is conveniently but not necessarily made from a length of metal pipe; therefore the ring is circular in transverse cross section. Except that it is desirable for the surface of the ring in contact with filter element 10 to be outwardly convex, the present invention is not limited to any particular shape for the cross section of the units of the ring. The intermediate section 15a is provided at the inside of the curve with a narrow, elongated orifice 18 as seen particularly in Fig. 7. Orifice 18 lies in a median plane passing through the axis of the pipe from which the unit is formed. At this position, orifice 18 lies centrally of the area of contact between filter element 10 and each unit 15 of the blow ring, as may be seen by reference to Fig. 8.

Orifice 18 extends for the full length of semi-circular section 15a, and thus extends for at least 180° of arc. If desired, the orifice may be extended at one or both ends for a short distance into the tangent sections 15b and/or 15c to provide greater assurance that none of the surface of the filter element is unscanned by the orifice; but the end of the orifice should not extend beyond a point where contact of the ring unit with the filter element itself is sufficiently firm to seal the orifice against undesired escape of air.

At each end of the intermediate section 15a is a terminal section 15b or 15c. Over the intermediate section the ring unit is in full, uniform contact with the filter element, while at the terminal sections 15a and 15c this contact decreases gradually until broken off completely. To effect this gradual decrease of contact, the terminal sections are preferably straight and tangent to the intermediate section at the ends of 180° of arc. Sections 15b and 15c are then parallel to each other. This design has practical advantages, but our invention is not limited thereto since the terminal sections may be of other shape; for example, slightly curved. Likewise they need not have the same cross-sectional area or shape as the intermediate section. The length of each terminal section is not critical except that it should extend reasonably far beyond contact of the ring with the filter element. The outer end of section 15b is closed while the corresponding end of section 15c is provided with a short angle section 15d to which is connected a hose 19 for introducing air under pressure into the unit. The two hoses 19 are connected to manifold 20 (Fig. 2) to which cleaning air under pressure is supplied through a flexible hose 21 from any suitable source of such air, not shown in the drawings.

Cleaning-air ring 12 is mounted upon carriage 14 which is in the form of an open, rectangular frame. At each side of the frame there is mounted a pair of pulleys 22. A cable 23, anchored at its ends, passes alternately over and under the pulleys of each pair, as indicated in Fig. 1, in order to guide the carriage in a path parallel to the vertical axis of filter element 10 and also to maintain the carriage in a proper position in a horizontal plane transverse to the direction of movement of the carriage. A chain or cable 24 with its ends fastened to the carriage reciprocates the carriage over this path. This structure, as well as suitable drive means for intermittently or continuously reciprocating the carriage along the length of filter element 10, are all shown and described in greater detail in the co-pending application of David B. Perlis, Ser. No. 313,112, entitled "Means for Stabilizing a Moving Body" filed October 4, 1952, now Patent No. 2,738,856, dated March 20, 1956. Carriage 14 not only supports the blow ring in position relative to the filter element and moves it along the filter element, but also supports the two units of the blow ring in such a manner as to provide limited relative movement of the two units to adjust to changes in diameter of the filter element.

For this purpose, there is provided on the carriage at opposite sides thereof, suitable guide means, shown particularly in Figs. 3 and 4. At one side of the carriage, there is a rectangular window 25 cut into the frame of carriage 14. Attached to the frame of carriage 14 over this window are a plurality of bars 26 that are spaced apart vertically in order to provide between each two bars a slot 27. Each slot 27 is of uniform width and extends horizontally, that is, transversely to the direction of travel of carriage 14.

The three bars 26 shown in Figs. 3 and 4 are attached directly to the carriage frame in such a manner that the slots extend across window 25 which affords access to the slots from inside the frame. At the opposite side of the blow ring, the construction differs somewhat in that the three bars 26 are mounted upon a pair of brackets 28 attached to manifold 20 which in turn is rigidly affixed to carriage 14. The bars 26 at this side of the blow ring likewise provide a pair of similar slots 27 at the same elevation and parallel to the slots 27 shown in Fig. 3.

At opposite sides thereof, each unit 15 of the blow ring is provided with a pair of outwardly extending parallel pins 30 which are all mounted with their axes in a common plane. Pins 30 are of a diameter to fit loosely within a slot 27 so that the pins are free to slide along the length of the slot but are confined by bars 26 against vertical movement transverse to the slot.

The units of the cleaning-air ring are mounted in place on the carriage by inserting pins 30 in selected slots 27. For example, viewing the ring as in Fig. 2, the left hand unit 15 has its pins 30 placed in the upper two slots 27 while the right hand ring has its pins in the lower two slots 27. The pair of pins at one side of the ring ride in one slot 27 while the pair of pins at the other side are in the corresponding slot 27. Two pins in a slot confine the ring to movement parallel to direction of the slot, each pin holds the ring against rotation about the other pin as well as preventing vertical movement of the unit. Washers 31 held in place by cotter pins or the like are preferably mounted on the pins 30 at the outer faces of the guide means in order to hold the units of the ring against horizontal movement in a direction parallel to the axes of pins 30.

It will be noted that the two units of the ring are mounted one above but closely spaced from the other with the ends of the two units in overlapping relationship. The vertcial spacing between slots 27 is such that a small clearance exists between the two units 15. This clearance is desirable in order that the ring units can move freely; but in general, the two units of the ring are mounted as close together as practical since, for a given carriage travel, this minimizes areas of the filter element not scanned by orifice 18.

Springs 33, located one at each side of the blow ring, provide yielding means urging each unit of the ring against the filter element. Each end of a spring is connected to a different unit 15, as shown in Figs. 3 and 4, by securing the spring to an upper and a lower pin 30. The springs pull the ring units toward each other and against the filter element, the strength of the springs being regulated to produce the desired indentation of the filter element.

It will be evident from Fig. 2 that the units of the cleaning-air ring completely encircle the filter element. Each orifice covers 180° of the circumference of the element so that two units can scan the full circumference of the filter element. Under ideal conditions when proper indentation is maintained, the ends of the two orifices 18 are vertically alined and no gap exists between the areas scanned by the vertical movement of the two orifices. If desired, the orifice can extend a short distance into one or both tangent sections so that no gap in coverage will exist even if the ring units move outwardly within the normal range of horizontal movement.

In their designed or ideal position, central sections 15a of the two units form a complete circle. The filter element, when distended by internal air pressure, also assumes a circular shape in cross-section. The radius $R_1$ to the inside surface of the ring is slightly less than the outside radius $R_2$ of the filter element by a substantially constant value, at any angular position. It follows that under the assumed ideal conditions the amount of indentation of the filter element is substantially uniform at all positions around the circumference of the filter element. These conditions produce the maximum effectiveness of the cleaning action of the air jet, giving both maximum cleaning action at the jet and maximum area covered for a given range of vertical movement of the cleaning ring. This in turn produces maximum filter efficiency since the maximum filtering area is cleaned with maximum efficiency.

Although the filter element may for various reasons depart from the exact diameter assumed, the normal range of departures is not great enough to alter to a material degree the above relations. The two halves of the ring can adjust to changes in diameter of the filter element by moving horizontally relative to each other. If so, there may be a short straight portion of the ring in contact with the filter element. To prevent any gap in the coverage by the orifices under these conditions, orifices may extend into the terminal sections for a short distance. This is comprehended within the description "substantial vertical alinement" of the ends of the orifices.

Experience shows that the flexible character of filter inside element 10 and the air pressure inside element 10 causes it to follow closely the shape of any object pressing against it. Consequently a sharp corner or the like in such an object creates a sharp bend in the filter element at which excessive wear occurs. Any such condition is eliminated in the present design by extending the units on beyond the end of the circular portions without any change in the profile of the surface in engagement with the filter element. This extension results in the tangent section at each end of a ring unit, which section should be long enough to extend beyond the limits of engagement with the filter element. To so extend both units of the ring requires the units to be in vertically spaced positions allowing the extensions or ends of the units to overlap each other.

From the above description it will be evident that various changes in the arrangement and design of our invention may be made without departing from the spirit and scope of the invention. In addition to variations already suggested, others are possible. For example, the cleaning-air ring may consist of a larger number of units than two, in which case each unit would be correspondingly shorter in the length of arc covered. For this reason, it is to be understood that the foregoing description is considered to be descriptive of rather than limitative upon the appended claims.

We claim:

1. In a self-cleaning dust-filter, the combination with a cylindrical filter element of a cleaning-air ring assembly adapted to clean the filter element by directing a jet of air through it, that comprises: a pair of similar hollow units arranged one at each of opposite sides of the filter element to encircle completely the filter element, each unit having an arcuate section of uniform radius having an inwardly facing orifice extending the full length of the arcuate section at the inner face thereof to direct a jet of air toward the filter element; a reciprocating carriage movable parallel to the axis of the filter element; guide means mounted on the carriage providing a plurality of pairs of straight parallel slots extending transversely of the axis of the filter element, the slots of each pair being spaced apart axially of the filter element; two pairs of outwardly extending pins attached to each ring unit, each pair of pins being in one of said slots to arrange the units of the ring one above the other with terminal portions of the units over-lapping one another so that all the air orifices combined extend substantially the full circumference of the filter element, the pins in each slot being free to slide lengthwise therein and limit the relative motion of the unit to the plane of the slot; yielding means urging each unit of the ring assembly against the filter element; and means supplying air to each of the hollow units.

2. A cleaning-air ring for a cylindrical filter element, comprising: a plurality of similar hollow units arranged at angular spaced positions around the filter element to encircle completely the filter element, each unit having an intermediate arcuate section of uniform radius and two straight terminal sections each tangent to one end of the arcuate section and extending beyond the zone of contact between the unit and the filter element, the arcuate section having an inwardly facing orifice extending the full length of the section at the inner face thereof to direct a jet of air toward the filter element, and the units of the ring being arranged one above the other with terminal portions of the units over-lapping one another so that all the air orifices together extend substantially the full circumference of each filter element; yielding means urging each unit against the filter element; and means supplying air to each of the hollow units.

3. A cleaning-air ring for a cylindrical filter element, comprising: a pair of similar hollow units arranged one at each of opposite sides of the filter element to encircle completely the filter element, each unit having a semi-circular section connected at each end to a tangent section, the semi-circular section having an inwardly facing orifice extending the full length of the semi-circular section at the inner face thereof to direct a jet of air toward the filter element, and the two units of the ring being arranged one above the other with terminal portions of the units over-lapping the other so that each two air orifices together extend substantially the full circumference of the filter element; yielding means urging each unit against the filter element; and means supplying air to each of the hollow units.

4. In a self-cleaning dust filter having a cylindrical filter element, the combination of a pair of similar hollow units arranged one at each of opposite sides of the filter element to encircle completely the filter element, each unit having an intermediate arcuate section extending for 180° of arc and having a uniform inner radius slightly less than the external radius of the cylindrical filter element when fully distended under internal gas pressure, and each unit having a straight terminal section tangent to the arcuate section at each end thereof, each arcuate section having an inwardly facing orifice extending the full length thereof to direct a jet of air toward and through the filter element; a carriage movable parallel to the axis of the filter element; means mounting the units on the carriage on above another with the terminal portions of one unit overlapping portions of another unit, said mounting means positioning the units with the orifice scanning the full circumference of the filter element and allowing limited individual movement of the units in a plane transverse to the axis of the filter element; resilient means urging the units into engagement with the filter element; and means supplying air to each of the hollow units.

References Cited in the file of this patent

UNITED STATES PATENTS

| | | |
|---|---|---|
| 2,511,817 | Sheldon | June 13, 1950 |
| 2,551,126 | Hersey | May 1, 1951 |
| 2,552,191 | Lang | May 8, 1951 |
| 2,661,079 | Osgood et al. | Dec. 1, 1953 |

FOREIGN PATENTS

| | | |
|---|---|---|
| 737,109 | Germany | July 7, 1943 |

UNITED STATES PATENT OFFICE

CERTIFICATE OF CORRECTION

Patent No. 2,818,136                                                       December 31, 1957

Norman M. McGrane et al.

It is hereby certified that error appears in the printed specification of the above numbered patent requiring correction and that the said Letters Patent should read as corrected below.

Column 7, line 37, before "other" strike out "the" and insert instead -- each --; same line, for "so that each" read -- so that the --; column 8, line 18, for "on above" read -- one above --.

Signed and sealed this 8th day of April 1958.

(SEAL)
Attest:

KARL H. AXLINE
Attesting Officer

ROBERT C. WATSON
Commissioner of Patents